US009767738B2

(12) United States Patent
Goerzen

(10) Patent No.: US 9,767,738 B2
(45) Date of Patent: *Sep. 19, 2017

(54) PROJECTION SYSTEM WITH ADDITIONAL SERIES CONNECTED LIGHT VALVE FOR ENHANCED CONTRAST

(71) Applicant: CHRISTIE DIGITAL SYSTEMS USA, INC., Cypress, CA (US)

(72) Inventor: Lawrence Goerzen, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,917

(22) Filed: Oct. 28, 2015

(65) Prior Publication Data

US 2016/0049121 A1 Feb. 18, 2016

Related U.S. Application Data

(63) Continuation of application No. 13/745,145, filed on Jan. 18, 2013, now Pat. No. 9,202,418.

(51) Int. Cl.
*G09G 3/34* (2006.01)
*H04N 9/31* (2006.01)
*G02B 26/08* (2006.01)
*G03B 33/04* (2006.01)
*G03B 33/12* (2006.01)

(52) U.S. Cl.
CPC ....... *G09G 3/3413* (2013.01); *G02B 26/0833* (2013.01); *H04N 9/3105* (2013.01); *H04N 9/3126* (2013.01); *G03B 33/04* (2013.01); *G03B 33/12* (2013.01)

(58) Field of Classification Search
CPC . G09G 3/3413; G02B 26/0833; H04N 9/3126
See application file for complete search history.

(56) References Cited

U.S. PATENT DOCUMENTS

| 7,551,341 | B1 * | 6/2009 | Ward | G03B 33/08 359/248 |
| 2008/0158262 | A1 * | 7/2008 | Russell | G09G 3/2033 345/690 |
| 2008/0266668 | A1 * | 10/2008 | Penn | G02B 26/0841 359/629 |

(Continued)

FOREIGN PATENT DOCUMENTS

| CN | 1682154 A | 12/2005 |
| CN | 1720750 A | 1/2006 |

OTHER PUBLICATIONS

Goerzen, Lawrence, "Projection System With Additional Series Connected Light Valve for Enhanced Contrast", U.S. Appl. No. 13/745,145, filed Aug. 3, 2015.

(Continued)

*Primary Examiner* — Amare Mengistu
*Assistant Examiner* — Sarvesh J Nadkarni
(74) *Attorney, Agent, or Firm* — Perry + Currier, Inc.

(57) ABSTRACT

A projection system is provided that uses an additional light valve in series with at least one color sub-assembly and respective light valve in order to increase the contrast of a projected image, wherein bit sequences are generated for the additional light valve that do not result in interference with the respective light valve bit sequences.

15 Claims, 7 Drawing Sheets

(56) References Cited

U.S. PATENT DOCUMENTS

2011/0175953 A1 7/2011 Geissler
2012/0320103 A1* 12/2012 Jesme ................. G09G 3/3413
　　　　　　　　　　　　　　　　　　　345/690

OTHER PUBLICATIONS

First Office Action dated Oct. 14, 2016 for Chinese Patent Applicatin No. 201310581631.2.

* cited by examiner

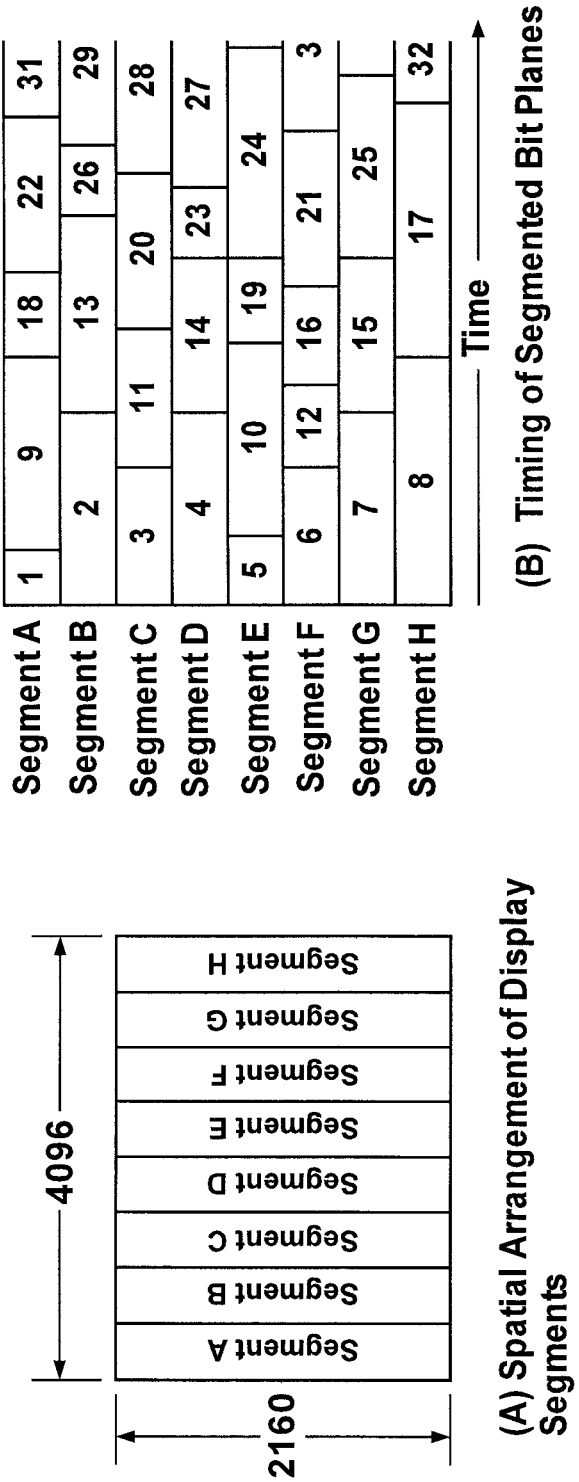

PROJECTION SYSTEM WITH ADDITIONAL SERIES CONNECTED LIGHT VALVE FOR ENHANCED CONTRAST

CROSS-REFERENCE TO RELATED APPLICATION

This is a continuation of application Ser. No. 13/745,145, filed Jan. 18, 2013, the contents of which are incorporated herein by reference.

BACKGROUND OF THE INVENTION

1. Field of the Invention

The present invention relates in general to projection systems, and more particularly to a projection system that uses an additional light valve in series with at least one color sub-assembly and respective light valve, to increase the contrast of a projected image.

2. Description of the Related Art

A typical color digital projector comprises a lamp, an illumination system, and a light engine that includes a color splitting-recombining prism (e.g. plumbicon prism). The optical function of the light engine is to split uniform illumination light into Red/Green/Blue (RGB) channels, relay each of the colors onto a light valve, such as a DMD (Digital Micromirror Device), and then re-combine all three channels into a single illumination light beam that is projected on a screen via a projection lens.

The DMD is an electromechanical device consisting of millions of microscopic mirrors that modulate light by independently flipping each mirror through a predetermined angle. Using three such DMDs on the color splitting-recombining prism, a white light cone from the lamp is separated into red, green, and blue channels. Each color is individually modulated by a respective DMD and then recombined by the prism.

The DMDs modulate the light by turning the mirrors on and off several times during a video frame. A frame is divided into approximately 20 to 60 bit planes of different duration, based on bit sequence and frame rate. During a given bit plane each pixel on the screen is controlled by a single bit and is either driven 'ON' or 'OFF' for the entire duration of the plane. The number, duration, and location of the "ON" times are adjusted with respect to the timing of the frame for controlling the light level. Combining the 'ON' times for a given pixel gives the pixel its proper intensity.

It is possible to add an additional light valve, such as a white DMD, in series with the conventional color (RGB) DMDs in order to improve the image contrast, without any of the compromises or artifacts that result from the use of a dynamic iris. The additional light valve enhances contrast by reducing the light incident on the color DMDs on a pixel-by-pixel basis such that different intensity levels turn the light on and off at different times. However, because a DMD modulates light by turning the mirrors 'ON' and 'OFF' over time in a series of bit planes, adding an additional light valve results in the intensity of a white pixel being, in most cases, different than the intensity of one of the R, G or B values for that pixel (i.e. the white and color DMDs are 'ON' and 'OFF' at unrelated times). This, in turn, results in unpredictable color and intensity variations and image artifacts.

Although the problem of unpredictable color and intensity variations may be overcome somewhat by using certain different technologies for the additional light valve (e.g. LCOS, LCD), other problems are introduced through the use of such different technologies. In particular, these technologies operate so as to dim all of the light (i.e. not just the off-state light), so that the input signal must be amplified in order to compensate and bring the image light output back to its original level. The amplification must spatially match the white image. However, exact spatial matching is not possible in the presence of any convergence error whatsoever. Although the latter problem may be solved by softening the edges of the white image and the gain function applied to the image, the effective gain in contrast is thereby reduced. Also, the white image cannot include any steep intensity slopes since these will be converted to image artifacts by any convergence error. LCOS and LCD technologies are also heat limited and do not function well in a high brightness projector.

SUMMARY OF THE INVENTION

It is an aspect of the present invention to provide a projection system that uses an additional light valve in series with the conventional color splitting-converging prism in order to increase the contrast of a projected image, wherein bit sequences are generated for the white DMD that do not result in interference with the color DMD bit sequences.

This together with other aspects and advantages which will be subsequently apparent, resides in the details of construction and operation as more fully hereinafter described and claimed, reference being had to the accompanying drawings forming a part hereof, wherein like numerals refer to like parts throughout.

BRIEF DESCRIPTION OF THE SOLE DRAWINGS

FIG. 9A shows segmentation of a light imaging panel into segments, and FIG. 9B shows sequencing of bit planes for display of the segments depicted in FIG. 9A, according to an embodiment.

DETAILED DESCRIPTION OF THE PREFERRED EMBODIMENTS

Figure 1:
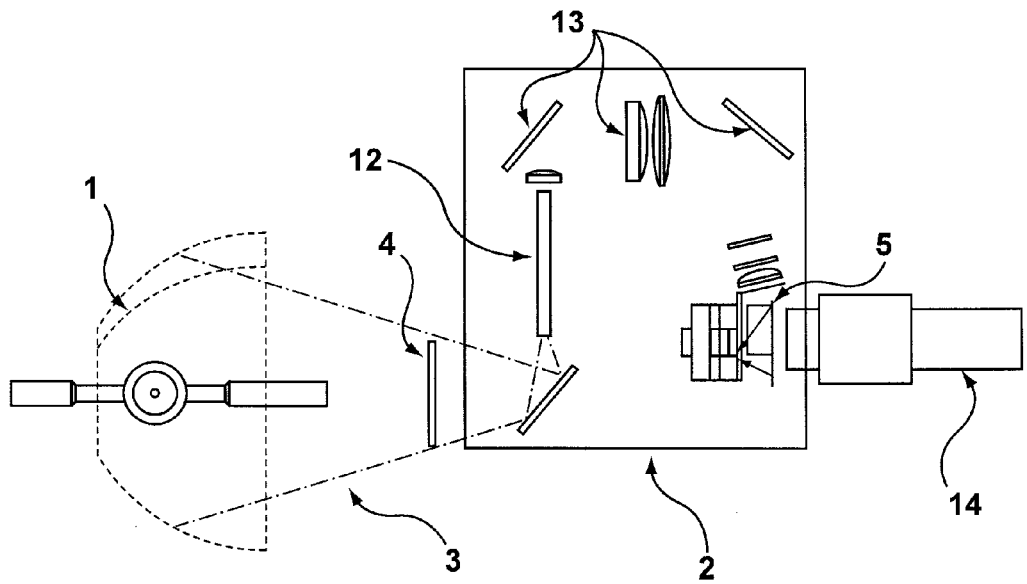
FIG. 1 is a schematic representation of a conventional color digital projector.

FIG. 1 shows a typical projector comprising a Xenon lamp and parabolic reflector 1 for creating a light cone 3 that passes through a UV filter 4 into an illumination system 2. The lamp is located at a first focal point of the parabolic reflector 1 for re-imaging the light cone 3 at a second focal point within the illumination system 2 that is co-incident with an integrator rod 12. The integrator rod converts the illumination pattern output from the lamp to a uniform rectangular pattern. The rectangular light beam output from integrator rod 12 is then imaged onto a light engine 5 by a relay lens system 13, and then projected by a projection lens 14 onto a screen (not shown) to produce an image.

Figure 2:
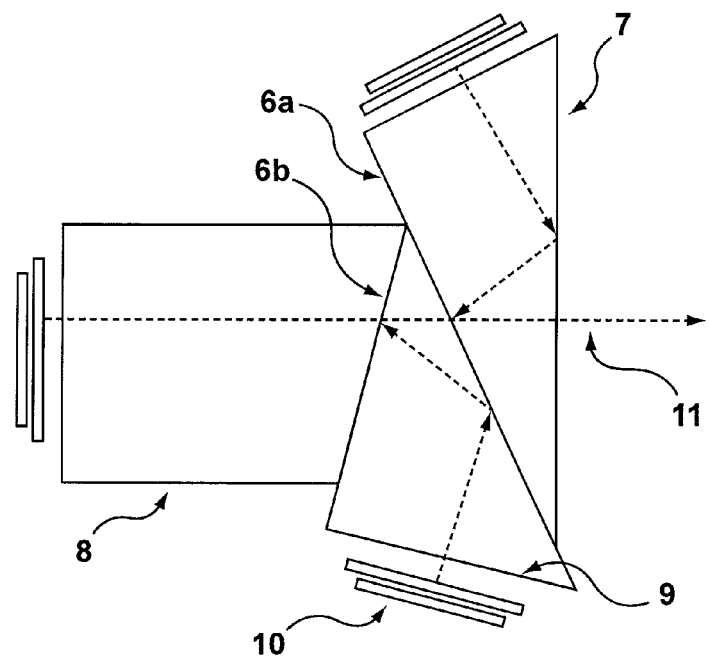
FIG. 2 is a schematic representation of a light engine of the projector in FIG. 1.

As shown in FIG. 2, light engine 5 includes a color splitting-converging prism (typically a plumbicon prism) with three prism elements. The prism comprises respective red channel 9, green channel 8 and blue channel sub-assemblies 7, each of which includes a light valve 10. The prism elements contain dichroic coatings 6a, 6b to separate the incoming white light into blue, green, and red. Each color is then separately modulated at each light valve 10. According to the exemplary embodiment, the light valves 10 are DMDs. As discussed above, a DMD is an electromechanical device that typically consists of millions of microscopic mirrors for modulating light by independently flipping each mirror through a predetermined angle (e.g. +−12 degrees, although other angles are possible). Each DMD 10 reflects the modulated light, which is re-converged by the prism into a colored image beam 11 for projection on the screen.

Figure 3:
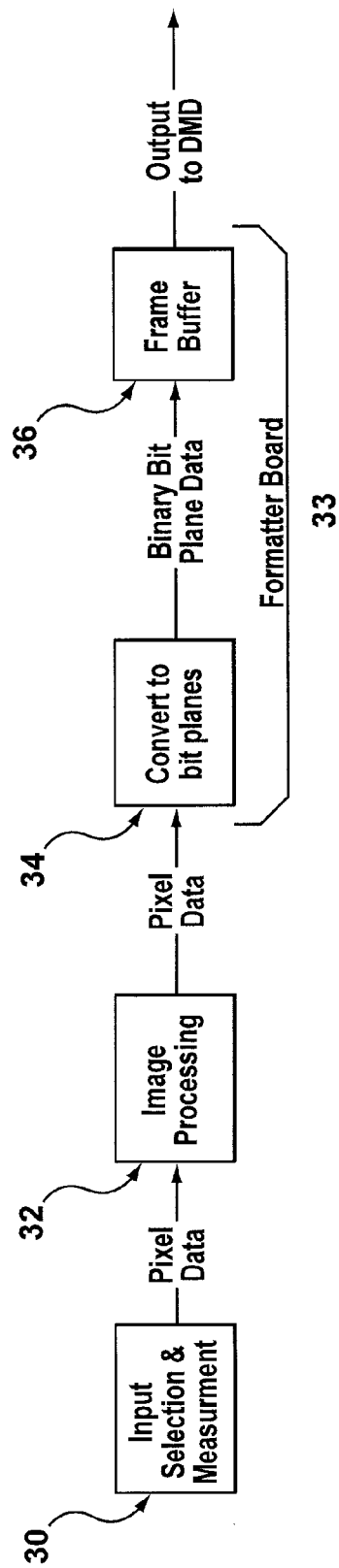
FIG. 3 is a block diagram showing image processing modules for applying image data to the light engine of FIG. 2.

With reference to FIG. 3, image pixel data (e.g. motion picture) is selected from a source input and measured at module 30, modified within image processing module 32, including scaling, warping, color matching, etc., and applied to a formatter that comprises a converter 34 for converting the pixel data to binary bit planes The pixel data that gets converted into bit planes, consists of a sequence of frames, each containing an array of pixels comprising an image. The bit planes are then loaded into a frame buffer 36 and thence to the DMDs 10.

The source of pixel data applied to converter 34 can be image processing module 32, or an image stored in memory, or data received over any video interface, and the data may but need not be measured or processed using module 30. If measurements are performed, they typically include the frequency of the horizontal and vertical sync pulses, and often include the location of the active window as well. The image processing functions set forth above are a few well known examples, and could include fewer or many others, as would be understood by a person of skill in the art.

Figure 4A:
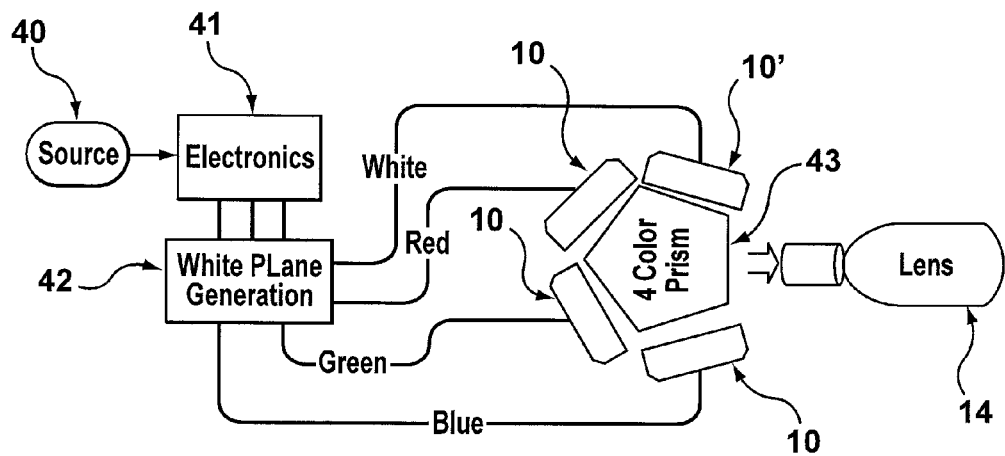
FIG. 4A is an electrical schematic representation of a light engine according to an embodiment of the invention, having an additional white DMD.
Figure 4B:
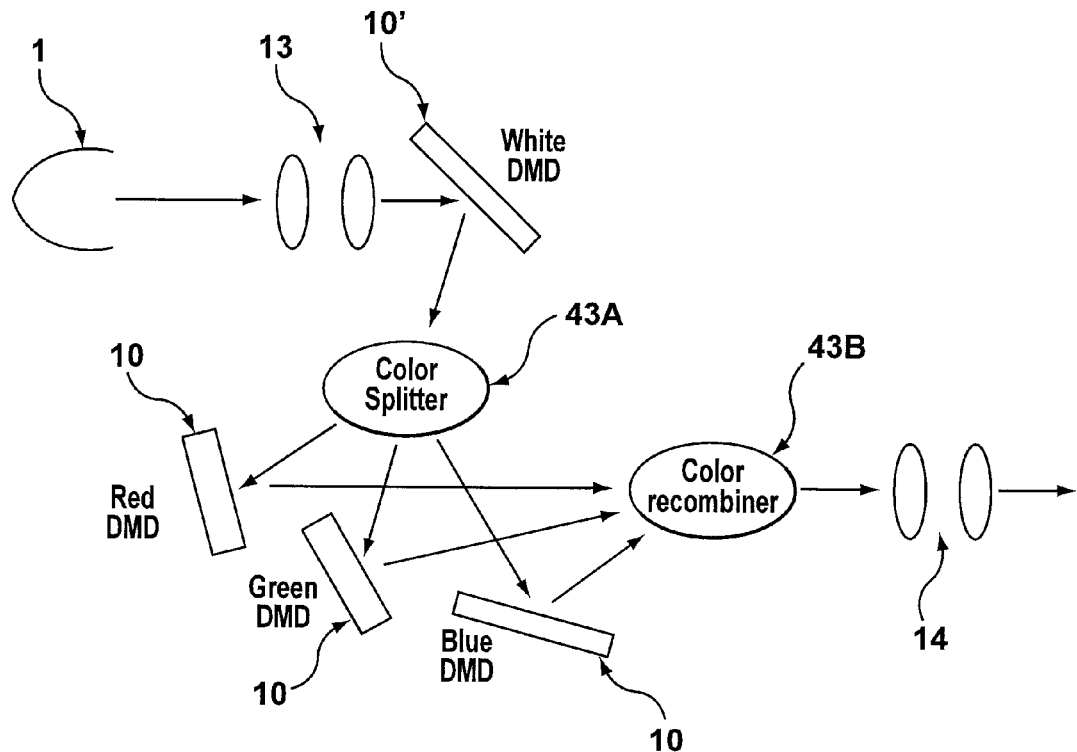
FIG. 4B is an optical schematic representation of a light engine according to the embodiment of FIG. 4B.

FIGS. 4A and 4B are electrical and optical schematic representations, respectively, of a light engine according to an embodiment of the invention, which includes an additional light valve, white DMD 10', for contrast enhancement, and a 4-color prism 43 with facets for each of the white DMD 10' and colored DMDs 10. The prism 43 is functionally illustrated in FIG. 4B as comprising a color splitter 43A and color re-combiner 43B. Image pixel data is received from a source 40 (e.g. hard drive) and processed via electronics 41, which incorporate modules 30 and 32 of FIG. 3. A white plane generation module 42 then generates the white bit plane based on the content of the red, green and blue bit planes, as discussed below with reference to FIG. 5, wherein the timing of switching the white and color DMDs is related so as to prevent unpredictable color and intensity variations and image artifacts.

A person of skill in the art will understand that the white DMD 10' may be placed before the colored DMDs 10, as illustrated, or may be placed after the colored DMDs 10.

Figure 5:
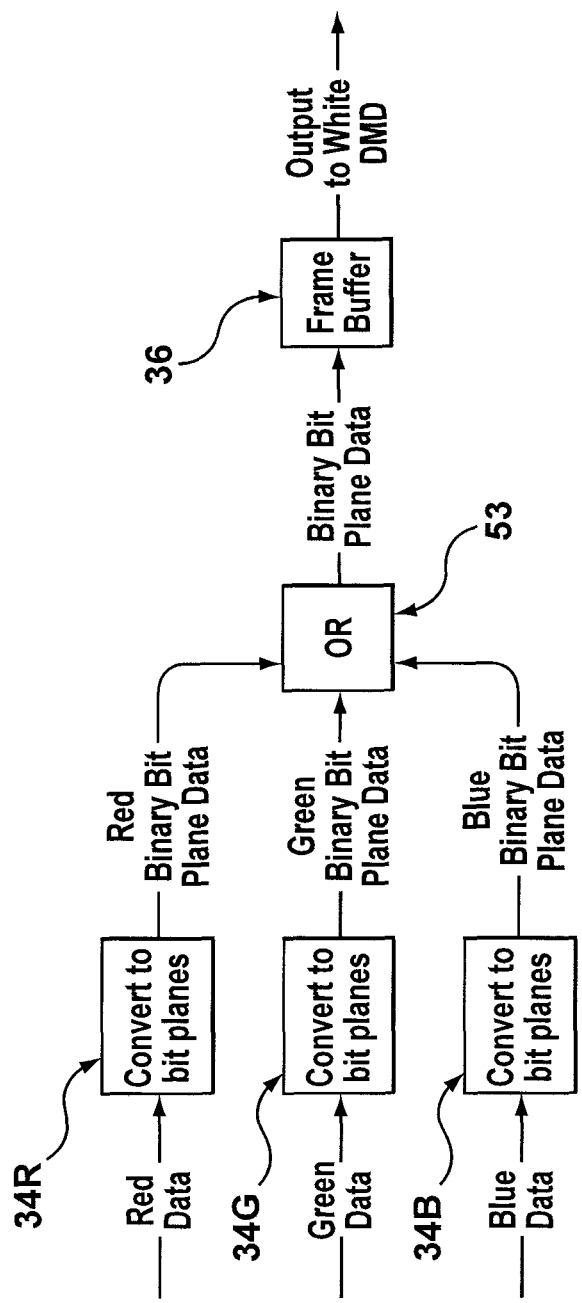
FIG. 5 is a block diagram showing how the bit planes for the white DMD are generated in the light engine of FIGS. 4A and 4B, according to an embodiment.
Figure 6:
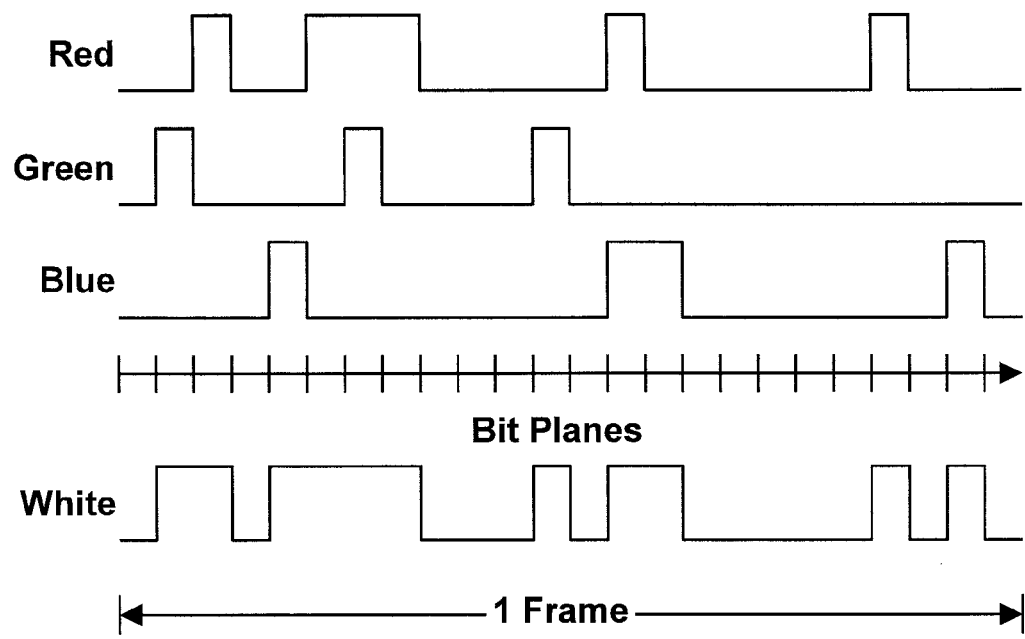
FIG. 6 is an exemplary timing diagram showing generation of white bit plane data from red, green and blue bit plane data using the white plane generation module of FIG. 5.

As shown in FIGS. 5 and 6, the bit plane data for the white DMD 10' is created within white plane generation module 42 by mixing the R, B and G binary bit plane data output from respective converters 34R, 34G and 34B, via an OR gate 53 so as to generate a white bit plane that ensures the white DMD 10' is on whenever any one of the red, green or blue DMDs 10 is on. However, wherever all of the colors are dark, the white DMD also turns off, producing a significantly darker dark.

Although not illustrated in FIG. 5, the R, B and G binary bit plane data output from respective converters 34R, 34G and 34B are also sent to respective frame buffers 36 for application to the color DMDs 10, in a conventional manner.

From the foregoing, it will be noted that all 'ON' state light from any color passes through the OR gate 53 without modification. This is in contrast with using LCOS or LCD for the additional light valve, which dim all the light for a pixel during the frame, and therefore require that the color data be amplified to exactly compensate for the dimming caused by the white light value.

With reference to FIG. 6, it should be noted that there is no need to precisely match the boundaries for the pixels in the white planes with the pixels in the R, G or B planes, so long as the area of white pixels fully contains all of the color pixels. If the white area is wider than the R, G or B planes by only a small amount (e.g. a few pixels), the only effect is a small loss of contrast around the edges of brighter areas.

Figure 7A:
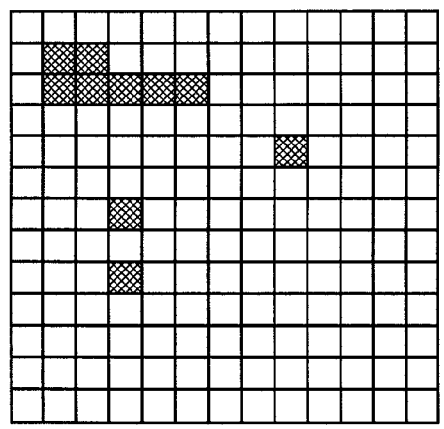
FIG. 7A shows an example of green data for one bit plane.
Figure 7B:
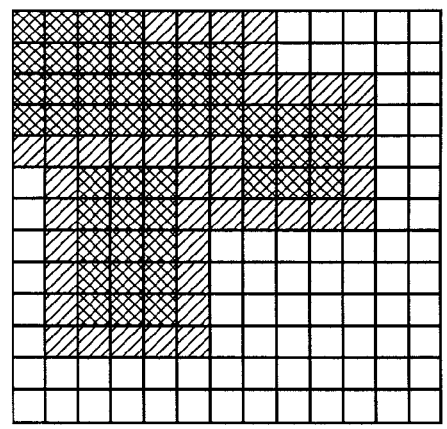
FIG. 7B shows an example of a resulting white bit plane where the white area is expanded by one pixel and two pixels beyond the green data, using the white plane generation module of FIG. 5.

FIG. 7A shows an example of green data for 1 bit plane and the white bit plane it produces. However, since perfect registration between the R, G and B light valves 10 and the white light valve 10' is sometimes difficult or impractical, advantage may be taken of the fact that the 'ON' pixel areas in the white bit planes can be wider than the image data from the color planes. If the white area is expanded by one pixel beyond the green data then the white bit plane is 'ON' for the dark grey area shown in FIG. 7B. If the white area is expanded by two pixels beyond the green data then the white bit plane is 'ON' for the combined light and dark grey areas shown in FIG. 7B.

According to an embodiment of the invention, expansion of the white area beyond the green data is performed by logic contained within block 42 shown in FIG. 4A, which includes the OR function of block 53 in FIG. 5. Thus, if the OR function 53 generates a white pixel, then block 42 generates three expansion pixels (i.e. one to the left and right of the white pixel generated by the OR function), and also ensures that the pixels above and below the white pixel are also set. A person of skill in the art will understand that the white pixel data may be expanded by two or more neighboring pixels beyond the colored pixel to accommodate misaligned pixels.

The amount of expansion needed (i.e. one or two pixels) is entirely determined by the accuracy of the optical convergence system of the projector. As discussed above, the only tradeoff in providing such a white area pixel expansion is a small loss of contrast around the edges of brighter areas.

Although it may be possible to align all DMDs 10 and 10' square to each other so that the image presented to each is a rectangle, if such is not possible the white image may have a keystone correction applied to it.

Figure 8:
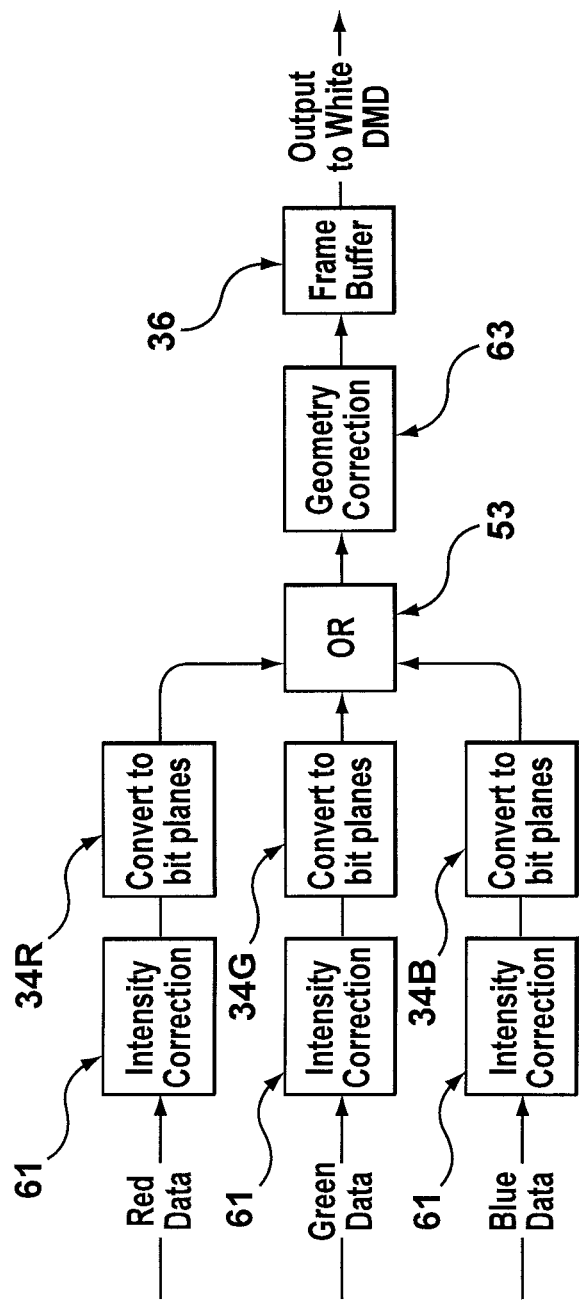
FIG. 8 is a block diagram of a white plane generation module of the light engine shown in FIG. 4 with keystone correction of the light on the white panel, according to an alternative embodiment.

If the white DMD 10' is positioned before the R, G and B DMDs 10 in the optical path, then keystone correction need only be applied to the white data and, and since the white DMD 10' provides only a gating function the applied keystone correction only needs to be a geometry correction (see module 63 in FIG. 8). However, if the white DMD 10' is placed after the color DMDs 10 and the light on the color DMDs 10 is not of uniform intensity, the correction must be applied to the color data prior to the creation of the white data, using intensity correction modules 61 as shown in FIG. 8.

Preferable, the white DMD 10' is of the same resolution as the other DMDs 10, in order to provide maximum benefit with the best contrast around the image edges. Sharp focus is also an advantage as it reduces the amount of white overspill required. However, a sharp focus also has the potential of creating a moiré pattern as a result of aliasing between the pixel grid patterns on the white panel and any one of the other panels, in which case the white DMD 10' may have to be slightly defocused.

Segmented displays may be used to increase the effective bandwidth and to reduce some artifacts, wherein segments are located within a single DMD panel and data for one bit plane is displayed on one segment at the same time that data from a different bit plane is displayed on another segment, as shown in FIG. 9A, which is a simplified depiction of a 4k panel (only 8 segments are shown for clarity, whereas an actual panel may have 32 segments). A person of skill in the art will understand that the vertically arranged segments shown in FIG. 9A may also be arranged horizontally, and that the number of segments may also vary.

Different panels may be separated into different arrangements of different numbers of bit planes, as shown in FIG. 9B.

Each segment has a different reset signal that causes the loaded bit plane to be displayed. This allows the start and end of each bit plane in a segment to occur at different times in different segments. Each numbered block in FIG. 9B represents the time sequence that a single bit plane in a single segment is displayed. The numbers inside the blocks show the order in which the bit planes are written into the DMD 10.

When a pixel from the edge of one segment is misaligned such that it lines up with the white pixel from the neighboring segment, the bit planes will no longer align and the pixel will not be displayed correctly. Although there are several solutions to this problem, the optimal solution is to output auxiliary timing bits for all bit sequences to identify when a bit plane is activated, which segment it is for, and which bit plane it is. This provides sufficient data to determine exactly which bit planes, in adjacent segments, overlap in time. The data for all relevant bit planes in the border area are then logically OR'd together, as discussed, above.

The bit sequences operate on the output side of the frame buffer 36 and have different and delayed timing from the input. The auxiliary data must therefore be captured on the output side of the frame buffer 36 and passed to the input through an additional buffer (not shown). The data will therefore not be available for the first frame after a new sequence is loaded, in which case a minimal number of pixels on either edge of a segment and for the white bit plane are caused to remain on for the first frame. This results in all pixels being displayed correctly, but with a minor image artifact in the form of a possibly visible light line in the image on very dark scenes for one frame.

In the basic implementation the output of 3 color panels feeds into a single contrast DMD (white) which enhances the contrast of all colors. In an alternate implementation each of the 3 colors can have its own contrast DMD. In this case the 3 colors do not get OR'ed, but all the other processing involving expanding the bit area for convergence errors, and segmented input, still applies.

Also, in alternate implementation each of the three colors (R, G and B) may be provided with its own contrast DMD, in which case the three colors do not get OR'ed, together although the processing discussed above takes place for white expansion, segmented display handling, and bit plane timing.

A person of skill in the art may conceive of other embodiments and variations. For example, it is possible to replace the white DMD 10' with three color DMDs 10, as follows: two red+two green+two blue, resulting in better heat handling, a simpler algorithm, but higher cost. This and other embodiments are believed to fall within the scope of the claims appended hereto.

What is claimed is:

1. A light engine for a projection system, comprising:
   at least one color sub-assembly and respective light valve;
   at least one additional light valve in series with said color sub-assembly and respective light valve; and
   a plurality of converters for converting source pixel data to color bit planes and a white plane generation module generating a further white bit plane based on the content of said color bit planes, each color bit plane driving said respective light valve and said further bit plane driving said additional light valve, wherein the timing of switching the additional light valve and respective light valve is related so as to prevent unpredictable color and intensity variations and image artifacts, wherein said white plane generation module includes an OR gate for combining said color bit planes and outputting a white bit plane such that said additional light valve is on whenever said respective light valve is on and said additional light valve is off whenever said respective light valve is off.

2. The light engine of claim 1, further comprising an intensity correction module for adjusting the intensity of each color to uniform intensity prior to converting said source pixel data to color bit planes.

3. The light engine of claim 1, further comprising a geometry correction module for keystone correction of said white bit plane.

4. The light engine of claim 1, wherein said additional light valve and said respective colored light valve are digital micromirror devices.

5. The light engine of claim 4, wherein each said digital micromirror device is segmented such that data for one bit plane is displayed on one segment at the same time that data from a different bit plane is displayed on another segment.

6. The light engine of claim 5, wherein each segment is arranged horizontally.

7. The light engine of claim 5, wherein each segment is arranged vertically.

8. The light engine of claim 1, wherein said additional light valve is located in the optical path before said respective light valve.

9. The light engine of claim 1, wherein said additional light valve is located in the optical path after said respective light valve.

10. A method for increasing contrast of a projected image, comprising:
    converting source pixel data to color bit planes;
    driving at least one light valve with a color bit plane for generating said projected image;
    generating a further white bit plane based on the content of said color bit planes; and
    driving at least one additional light valve with said further bit plane for enhancing contrast of said projected image while preventing unpredictable color and intensity variations and image artifacts, wherein generation of said further bit plane comprises combining said color bit planes and outputting a white bit plane such that said additional light valve is on whenever said at least one light valve is on and said additional light valve is off whenever said at least one light valve is off.

11. The method of claim 10, further comprising adjusting the intensity of each color to uniform intensity prior to converting said source pixel data to color bit planes.

12. The method of claim 11, further comprising keystone correction of said white bit plane.

13. The method of claim 10, further comprising generating at least one white pixel on each side of each colored pixel of said projected image.

14. The method of claim 10, further comprising segmenting data applied to said at least one light valve, such that one bit plane is displayed on one segment at the same time that data from a different bit plane is displayed on another segment.

15. The method of claim 14, wherein each segment is loaded with a bit plane under control of a timing signal that allows the start and end of each bit plane in a segment to occur at different times in different segments.

* * * * *